Jan. 23, 1962 J. E. RAIDEL 3,018,118
SEMIAUTOMATIC SAFETY HITCH
Filed Oct. 7, 1960 2 Sheets-Sheet 1
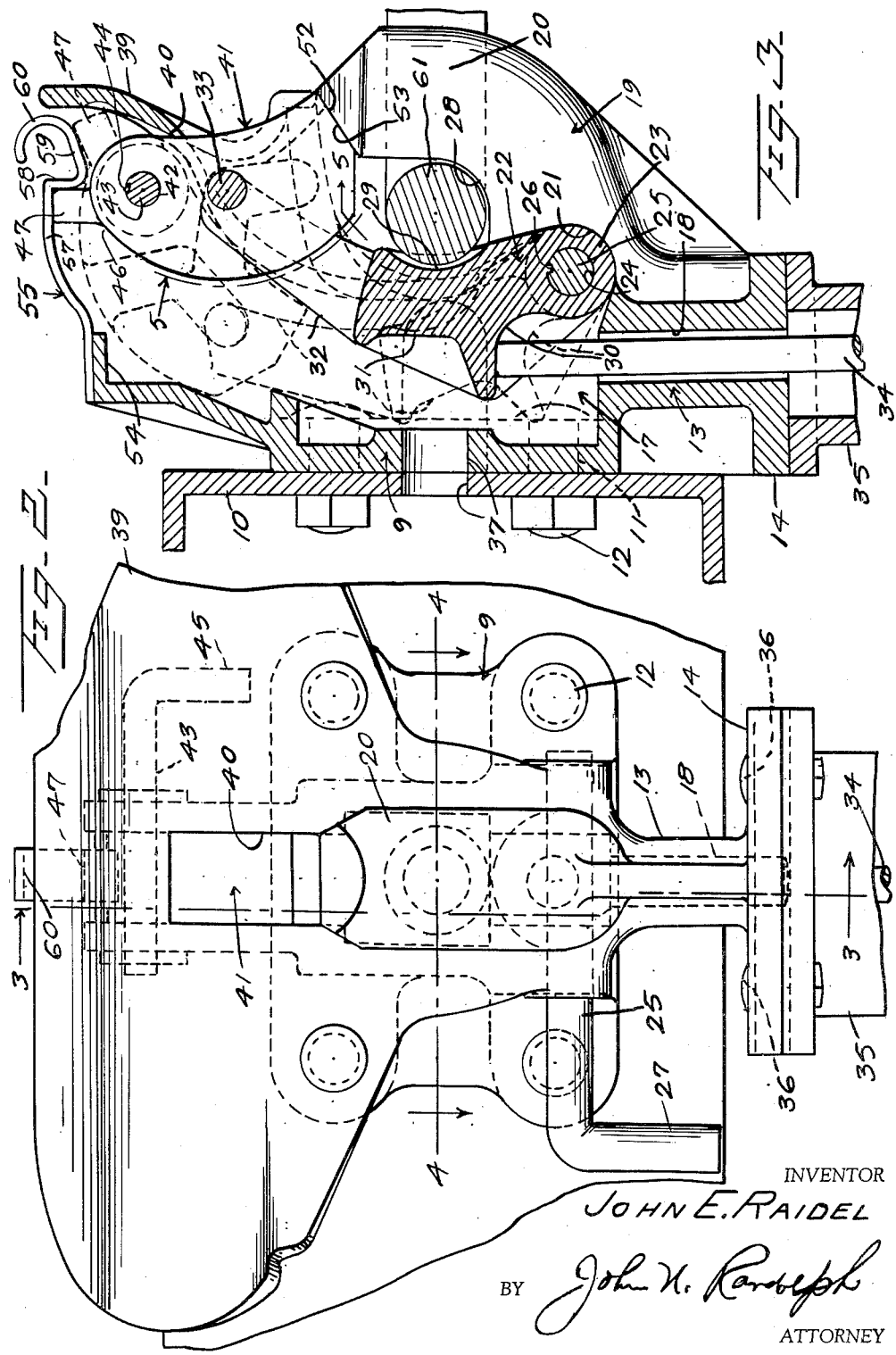
INVENTOR
JOHN E. RAIDEL
BY John N. Randolph
ATTORNEY Jan. 23, 1962    J. E. RAIDEL    3,018,118
SEMIAUTOMATIC SAFETY HITCH
Filed Oct. 7, 1960    2 Sheets-Sheet 2
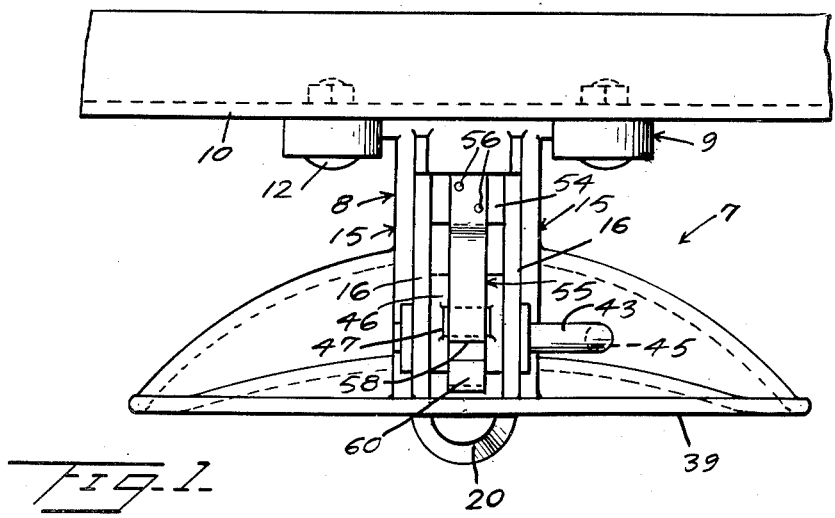
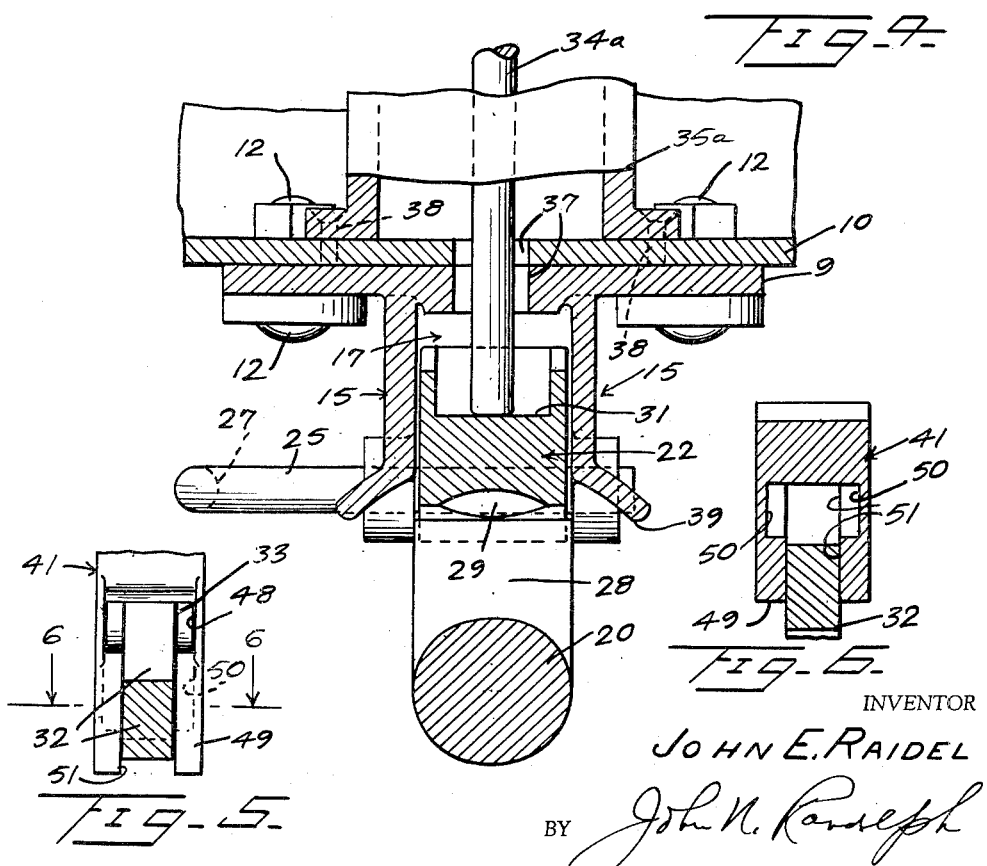
INVENTOR
JOHN E. RAIDEL
BY John N. Randolph
ATTORNEY United States Patent Office 3,018,118
Patented Jan. 23, 1962

3,018,118
SEMIAUTOMATIC SAFETY HITCH
John E. Raidel, 15002 Dunton Drive, Whittier, Calif.
Filed Oct. 7, 1960, Ser. No. 61,215
6 Claims. (Cl. 280—506)

This invention relates to a safety hitch for coupling a trailer vehicle to a draft vehicle, and more particularly to a hitch adapted to be mounted on the rear end of the draft vehicle and having an upwardly extending hook to receive the coupling eye of a conventional drawbar linkage of the trailer vehicle.

More particularly, it is an object of the present invention to provide a safety hitch including a pivotally mounted lever or tumbler which is yieldably held in an operative position engaging against the drawbar eye and which functions as a shock absorber to prevent play between the drawbar eye and the hitch hook.

Still a further object of the invention is to provide a hitch having a locking member which is detachably interengaged with the lever or tumbler and which is automatically moved with the lever or tumbler from a released position to an engaged position of the hitch.

Still another object of the invention is to provide a hitch wherein the locking member will be maintained in a locking position to prevent disengagement of the drawbar eye from the hitch hook in the event of failure of the means for applying a yieldable pressure to the lever or tumbler.

Still another object of the invention is to provide a safety hitch the parts of which can only be moved to a disengaged position for releasing a drawbar therefrom by a manual operation, to positively prevent an accidental disengagement of the drawbar eye from the hitch.

Still another object of the invention is to provide a safety hitch having a combination bumper and guide to be engaged by the drawbar eye for guiding the drawbar eye into engagement with the hook of the hitch and to prevent the drawbar eye from striking and damaging any of the parts of the hitch.

Various other objects and advantages of the invention will hereinafter become more fully apparent from the following description of the drawings, illustrating a presently preferred embodiment thereof, and wherein:

FIGURE 1 is a top plan view of the hitch;
FIGURE 2 is an enlarged fragmentary front elevational view thereof;
FRIGURE 3 is a vertical sectional view taken substantially along the line 3—3 of FIGURE 2;
FIGURE 4 is a horizontal sectional view, taken substantially along a plane as indicated by the line 4—4 of FIGURE 2;
FIGURE 5 is a sectional view taken substantially along the line 5—5 of FIGURE 3, and
FIGURE 6 is a sectional view taken substantially along a plane as indicated by the line 6—6 of FIGURE 5.

Referring more specifically to the drawings, the safety hitch in its entirety and comprising the invention is designated generally 7 and includes a hitch body, designated generally 8, having a front wall 9 the front side of which is adapted to bear flush against the rear vertical surface of a rear frame member 10 of a draft vehicle. Said front wall 9 is provided with fastening receiving openings 11 to receive nut and bolt fastenings 12 for securing the hitch body immovably to the frame member 10 and in substantially an upright position, as seen in FIGURES 2 and 3.

The hitch body 8 includes a bottom portion 13 which is rearwardly offset from the front wall 9 and which has an enlarged substantially horizontally disposed bottom mounting flange 14. The hitch body is provided with spaced apart substantially parallel side walls 15 which are formed integral with and extend rearwardly from the front wall 9 and which are likewise formed integral with and extend upwardly from the bottom portion 13. The side walls 15, as seen in FIGURES 1 and 2, have upper portions 16 which are inwardly offset relative to the lower portion thereof. The side walls 15 combine with the front 9 and the bottom portion 13 to define an elongated chamber 17 within the hitch body 8, which extends upwardly from said bottom portion 13. The bottom portion 13 has a bore 18 which opens upwardly into the bottom of the chamber 17 and downwardly through its bottom mounting flange 14.

The hitch body 8 includes a portion 19 which extends rearwardly and upwardly from the bottom portion 13 and which has a rearwardly offset upper part of circular cross section forming an upwardly extending hook 20. The lower portion and forward side of the part 19 and an adjacent portion of the upper end of the body portion 13 are recessed, as seen at 21 in FIGURE 3, between the lower portions of the side walls 15.

An elongated lever or tumbler, designated generally 22, has a rounded lower end 23 which turnably fits in the bottom portion of the recess 21 and which has a bore 24 extending transversely therethrough to receive a shaft 25 which extends through and is journaled in lower portions of the side walls 15 for mounting said lever or tumbler 22 for limited rocking or oscillating movement within the cavity 17 of the body 8. The shaft 25 may be secured in any suitable manner to the lever 22, as by means of a key 26, as seen in FIGURE 3. The shaft 25 has a right angularly turned end forming a handle 27, as seen in FIGURE 2.

As seen in FIGURE 3, the hook 20 has on its forward or inner side a rounded surface defining an upwardly and forwardly facing drawbar eye seat 28. The lever 22 has a rearwardly facing surface 29 which is disposed above the seat 28 and faces the hook 20, said surface 29 being concavely dished lengthwise and crosswise of the lever to form a seat for the drawbar eye and which functions with the seat 28, as will hereinafter be described.

The opposite or forward side of the lever 22 is provided with a bottom recess 30 which opens downwardly and forwardly, and a recess 31, disposed above the recess 30 and which opens forwardly.

The lever or tumbler 22 has a neck 32 of restricted width which extends upwardly from a lower portion thereof, which lower portion terminates adjacent the upper ends of the seat 29 and recess 31. The neck 32 is provided with a laterally enlarged head 33 at its upper extremity constituting a lateral enlargement of circular cross section, as best seen in FIGURE 3. The lever or tumbler 22 is curved longitudinally from end-to-end thereof with the seat 29 being formed in the rearwardly facing concave side or edge of said lever.

As shown in FIGURE 3, a push rod 34 extends upwardly through and is loosely disposed in the bore 18 and has an upper end seating in the lower recess or socket 30 of the lever 22. The push rod 34 preferably forms a part of a conventional pneumatic ram, a part of the housing 35 of which is secured by fastenings 36 or in any other suitable manner to the underside of the mounting flange 14, as seen in FIGURE 2. When the pneumatic ram of which the rod 34 forms a part is pressurized, said rod will be displaced upwardly to its position of FIGURE 3 for yieldably holding the lever 22 in its full line position of this view. The push rod 34 may be actuated by other fluid pressure means or even by mechanical means; however, preferably a yieldable pressure is exerted thereon, for a purpose which will hereinafter become apparent. FIGURE 4 illustrates a different positioning of the push rod and shows said push rod 34a extending loosely through aligned openings 37 of the wall 9 and member 10. The frame or housing portion 35a is secured by fastenings 38 to the front side of the member 10. The rear end of the push rod 34a engages in the upper recess 31. When a force is applied to displace the push rod 34a rearwardly and to its position of FIGURE 4, the push rod will cause the lever 22 to swing clockwise about its pivot 25, as seen in FIGURE 3, from its dotted line to its full line position thereof, in the same manner that said lever 22 is swung to its full line position by upward displacement of the push rod 34.

The body member 8 includes a bumper plate and guide 39 which is secured to the rear edges of the side walls 15 and which define an opening 40 which opens rearwardly between said side walls. The rearwardly facing outer side of the bumper and guide plate 39 is dished both horizontally and vertically and the lower portion thereof is disposed substantially forward of the hook 20, as seen in FIGURE 3. As shown in FIGURES 1 and 2, the upper portion of the bumper and guide plate 39 is of considerable horizontal width; however, the width of said upper portion of the plate 39 may vary substantially and may be considerably less than as illustrated. As seen in FIGURES 3 and 4, the seat 29 of the lever 22 protrudes rearwardly through the lower portion of the opening 40 of said bumper plate.

A locking member 41 is loosely mounted between the upper portions 16 of the side walls 15 and is provided in its upper part with a transverse bore 42. A shaft 43 extends through the bore 42 and projects through and is journaled in the side wall portions 16. The shaft 43 may be secured by a key 44 to the locking member 41, as seen in FIGURE 3, and one end of said shaft is turned at a right angle to form a handle 45, which is located behind a part of the bumper and guide plate 39. The locking member 41 has a rounded upper end 46 which is disposed nearly concentrically around the bore 42, a part of which is provided with an outwardly projecting lug or tooth 47.

As seen in FIGURES 5 and 6, the locking member 41 is recessed to provide an upper recessed portion 48 which opens outwardly of its inner or rear edge 49, and a recess which opens upwardly into the upper recess 48 and which is of T-shaped cross section including an inner portion 50 of the same width as the recess 48 and an outer portion 51 which is slightly wider than the thickness of the neck 32 but narrower than the head 33. Said restricted portion 51 opens outwardly of the forward or inner edge of the locking member 41, below the recess 48, and also outwardly of the lower end of said locking member. The locking member 41 has an inclined lower end or bottom surface 52 which abuts flush against an inclined top surface 53 of the hook 20, in the operative position of the locking member 41, as seen in full lines in FIGURE 3. The recessed portion 51 opens outwardly through a part of said surface 52.

The rear wall 9 is provided with a top flange 54 on which an end of a leaf-type latch spring 55 is secured in any suitable manner, as by means of fastenings 56, as seen in FIGURE 1. The latch 55 includes an upwardly curved portion 57 which extends from the secured end and which terminates in a downwardly extending portion 58. The latch 55 includes an upwardly and rearwardly inclined portion 59 extending from its depending portion 58 and the other free end of the leaf spring latch is formed by a turned back hook-like extension of the portion 59 and which forms a handle 60.

In the full line operative position of the locking member 41, as seen in FIGURE 3, the tooth 47 is disposed under the upwardly bowed latch portion 57 and has its rear side abutting against the depending portion 58 which forms a spring detent for releasably holding the locking member in its full line operative position. When the locking member 41 is swung upwardly and forwardly to its inoperative dotted line position, it will be noted that the latch portion 59 bears against the other side of the tooth 47 to provide a detent for releasably retaining said locking member in its inoperative position inclined forwardly and away from the upper portion of the opening 40, through which a part of said locking member extends, in the operative position thereof.

It will also be noted that when the locking member 41 is in its operative position as shown in FIGURES 1 and 2 and in full lines in FIGURE 3, that the recess 48 is disposed so that the head 33 can swing freely into and out of said recess. When the lever 22 is also in its full line position, the head 33 is disposed in the upper part of the recess 48 and a part of the neck 32 extends downwardly therefrom through a portion of the restricted recess portion 51. Assuming that no pressure is being exerted on the lever 22 by the push rod 34 or the push rod 34a, the shaft handle 45 can be manually turned to turn the shaft 43 clockwise, as seen in FIGURE 3, for swinging the locking member 41 upwardly and forwardly from its full line operative position to its dotted line inoperative position. During this movement, the lever 22 will be swung toward its dotted line inoperative position of FIGURE 3 by the head 33 moving downwardly in the enlarged inner recessed portion 50 and so that a part of the neck 32 will then extend through the bottom portion of the restricted recess 51. Thus, manual movement of the locking member 41 to an inoperative position also moves the lever 22 to an inoperative position, if said lever 22 is in an operative position when movement of the locking member 41 is commenced. As it will hereinafter become apparent, this is the only manner in which the locking member 41 can be moved from its operative to its inoperative position. In moving the locking member 41 upwardly and forwardly toward its inoperative dotted line position of FIGURE 3, sufficient force can be exerted on the handle 45 to cause the tooth 47 to cam the latch 55 upwardly so that said tooth can pass under the detent portion 58, after which said latch 55 will spring back to its position of FIGURE 3 with its detent portion 59 engaging the other side of the tooth 47 for latching the locking member 41 in its inoperative position.

With the lever 22 and locking member 41 in their dotted line inoperative positions, the upwardly extending hook 20 is exposed so that the eye 61 of a conventional trailer drawbar linkage, not shown, which is mounted for vertical swinging movement, can be engaged over the hook 20. To accomplish this, the drawbar linkage is swung upwardly sufficiently so that the eye 61 is disposed above the level of the upper end of the hook 20, after which the draft vehicle, to which the hitch 7 is secured, is backed toward the drawbar eye until said eye strikes the bumper plate 39 and is guided by its dished contour into engagement over the hook 20, and with a part of the eye 61 resting on the seat 28. The push rod 34 is then actuated and caused to move upwardly for exerting an upward force against the portion of the socket 30 engaged thereby for swinging the lever 22 from its inoperative dotted line position to its full line operative position of FIGURE 3, in which latter position the seat 29 bears against another portion of the drawbar eye 61. As the lever 22 is swung to its operative position, the head 33 thereof by its engagement with the rear wall of the recessed portion 50 will exert a camming action on the locking member 41 to cause said locking member to swing simultaneously with the lever from its inoperative dotted line position downwardly and rearwardly to its full line operative position, in which latter position the lower portion of the locking member will provide an obstruction to effectively prevent the drawbar eye 61 being disengaged from the hook 20. A constant force is maintained on the push rod 34 to maintain it bearing yieldably against the socket 30, so that the seat 29 will remain in snug engagement with the drawbar eye 61 to prevent play between the drawbar eye and hook 20. It will be readily apparent that the same operation can be accomplished and in the aforedescribed manner, utilizing the push rod 34a instead of the push rod 34 and whereby the force is exerted rearwardly against the socket 31 for moving the parts to their full line operative positions of FIGURE 3 and for maintaining the seat 29 in snug engagement with the drawbar eye.

Should a pressure failure occur on the fluid pressure responsive means by which a force is exerted on the push rod 34 or 34a, it will be apparent that a movement of the drawbar eye 61 forwardly with respect to the hitch 7 will force the lever 22 to swing from its operative full line position to its inoperative dotted line position of FIGURE 3. However, should this occur, the lever 22 will move relative to the locking member 41 since the head 33 thereof will swing forwardly through and out of engagement with the recess 48 and the locking member 41 will still be maintained in its locking position by the spring detent portion 58 engaging the rear side of the tooth 47. Even if the spring 55 should also break, the locking member 41 would still be unable to swing upwardly and forwardly to its inoperative, dotted line position, since said swinging movement of the locking member 41 relative to the lever 22 will result in the front edge 49 of the locking member, through which the recessed portion 51 opens, striking the head 33 and preventing the locking member 41 from swinging sufficiently away from its operative position to permit disengagement of the eye 61 from the hook 20. Thus, the eye 61 cannot become inadvertently disengaged from the hitch 7.

In order to disengage the eye 61, the lever 22 must be in its full line position of FIGURE 3 and the handle 45 must be manually turned to swing the locking member 41 and lever 22 to their inoperative dotted line positions.

Various modifications and changes are contemplated and may be resorted to, without departing from the function or scope of the invention as hereinafter defined by the appended claims.

I claim as my invention:

1. A semiautomatic safety hitch comprising a hitch body adapted to be secured to and disposed behind a rear draft vehicle frame member, said hitch body having an upwardly projecting hook adapted to be engaged by a trailer vehicle drawbar eye, a lever, pivot means swingably mounting said lever at a lower end thereof in the hitch body in front of said hook for swinging movement toward and away from the hook, a locking member, pivot means swingably mounting said locking member, adjacent an upper end thereof, in said hitch body and above the hook, a push rod extending slidably through a part of said hitch body and engaging a part of said lever which is disposed above and spaced from the lever pivot means for swinging said lever rearwardly within the hitch body toward said hook for confining a part of the drawbar eye between said hook and a part of the lever, and said locking member and lever having detachably interengaging portions causing said locking member to swing with the lever downwardly and rearwardly to position a part of the locking member against an upper part of the hook as the lever is swung rearwardly toward the hook.

2. A semiautomatic safety hitch as in claim 1, said interengaging portion of the lever being disengageable from the locking member by swinging movement of said lever away from said hook, said hitch body having a part forming an obstruction limiting swinging movement of said lever away from the hook, and said interengaging portion of the lever providing a stop to restrict swinging movement of the locking member away from the hook, when the lever is in engagement with said body obstruction, to prevent the locking member from moving sufficiently away from the hook to permit disengagement of the drawbar eye from the hook.

3. A semiautomatic safety hitch as in claim 1, a spring latch mounted on and secured to a part of said body and selectively engaging portions of said locking member for releasably latching the locking member in either an operative position in engagement with said hook or in an inoperative position swung upwardly and forwardly and out of engagement with the hook, and said interengaging portions of the locking member and lever functioning to latch the lever in a retracted inoperative position when the locking member is held in an inoperative position by said latch member.

4. A semiautomatic safety hitch as in claim 1, and a handle connected to the pivot means of the locking member for manually swinging said locking member upwardly and forwardly away from the hook to an inoperative position and for causing said lever to be swung away from the hook, simultaneously with the locking member, by the interengaging portions of the lever and locking member.

5. A semiautomatic safety hitch as in claim 1, and a handle connected to the pivot means of the lever and manually operable for swinging said lever toward the hook together with said locking member or relative thereto and away from the hook and locking member.

6. A semiautomatic safety hitch comprising a hitch body having an outer portion including an upwardly projecting hook adapted to be engaged by a coupling eye, a lever having a lower end, means pivotally mounting said lever at said lower end on the hitch body for swinging movement toward and away from the hook, a locking member having an upper end, means pivotally mounting the locking lever adjacent said upper end on the hitch body and above the hook, a push rod extending slidably through a part of the hitch body and engaging against a part of the lever which is spaced from said lower end for swinging the lever toward the hook for confining a part of the coupling eye between the hook and lever, said lever having a free end detachably engaging with a portion of the locking member for causing said locking member to swing with the lever for positioning a part of the locking member against an upper part of the hook as the lever is swung toward the hook.

References Cited in the file of this patent

UNITED STATES PATENTS

| | | |
|---|---|---|
| 1,860,973 | Yeakel | May 31, 1932 |
| 2,295,021 | Weiss | Sept. 8, 1942 |
| 2,370,679 | Martinelli et al. | Mar. 6, 1945 |
| 2,409,399 | Solon | Oct. 15, 1946 |
| 2,522,791 | Ketel | Sept. 19, 1950 |